(12) United States Patent
Sumanasekera et al.

(10) Patent No.: US 12,206,091 B2
(45) Date of Patent: Jan. 21, 2025

(54) LITHIUM MOLYBDATE ANODE MATERIAL

(71) Applicant: University of Louisville Research Foundation, Inc., Louisville, KY (US)

(72) Inventors: Gamini U. Sumanasekera, Louisville, KY (US); Mahendra K. Sunkara, Louisville, KY (US); Alejandro Martinez-Garcia, Louisville, KY (US); Ruchira Ravinath Dharmasena, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 335 days.

(21) Appl. No.: 16/905,973

(22) Filed: Jun. 19, 2020

(65) Prior Publication Data

US 2020/0403224 A1    Dec. 24, 2020

Related U.S. Application Data

(60) Provisional application No. 62/864,760, filed on Jun. 21, 2019.

(51) Int. Cl.
| H01M 4/136 | (2010.01) |
| H01M 4/02 | (2006.01) |
| H01M 4/04 | (2006.01) |
| H01M 4/1397 | (2010.01) |
| H01M 10/0525 | (2010.01) |

(52) U.S. Cl.
CPC ......... *H01M 4/136* (2013.01); *H01M 4/0428* (2013.01); *H01M 4/1397* (2013.01); *H01M 10/0525* (2013.01); *H01M 2004/027* (2013.01)

(58) Field of Classification Search
CPC ........ H01M 4/13; H01M 4/134; H01M 4/136; H01M 4/1397; H01M 4/0428; H01M 10/0525; H01M 2004/027
See application file for complete search history.

(56) References Cited

U.S. PATENT DOCUMENTS

| 2011/0269024 A1* | 11/2011 | Choi | ...................... H01M 4/38 |
| | | | 252/182.1 |
| 2015/0214555 A1* | 7/2015 | Visco | .................. H01M 4/5815 |
| | | | 429/188 |
| 2017/0309914 A1* | 10/2017 | Drews | ................. H01M 4/0445 |

OTHER PUBLICATIONS

Nadimicherlaet.al. Single crystalline flower like a-MoO3 nanorods and their application as anode material for lithium-ion batteries, Journal of Alloys and Compounds, vol. 687,pp. 79-86(Year:2016).*
Martinez-Garcia,A.,Thapa,A.,Dnarmadasa,R.etal.Highrateanddurable,binderfreeanodebasedonsiliconloadedMoO3nanoplatelets. SciRep5, https://doi.org/10.1038/srep10530(Year:2015).*

* cited by examiner

*Primary Examiner* — Matthew T Martin
*Assistant Examiner* — Ankith R Sripathi
(74) *Attorney, Agent, or Firm* — ALGM LLP; Harry J. Guttman

(57) ABSTRACT

A high capacity anode material comprising pre-lithiated $\alpha$-$MoO_3$ nanostructures is provided. A lithium sulfur full cell, battery, or pouch cell comprising the anode material and methods of fabricating the same are also provided.

17 Claims, 10 Drawing Sheets

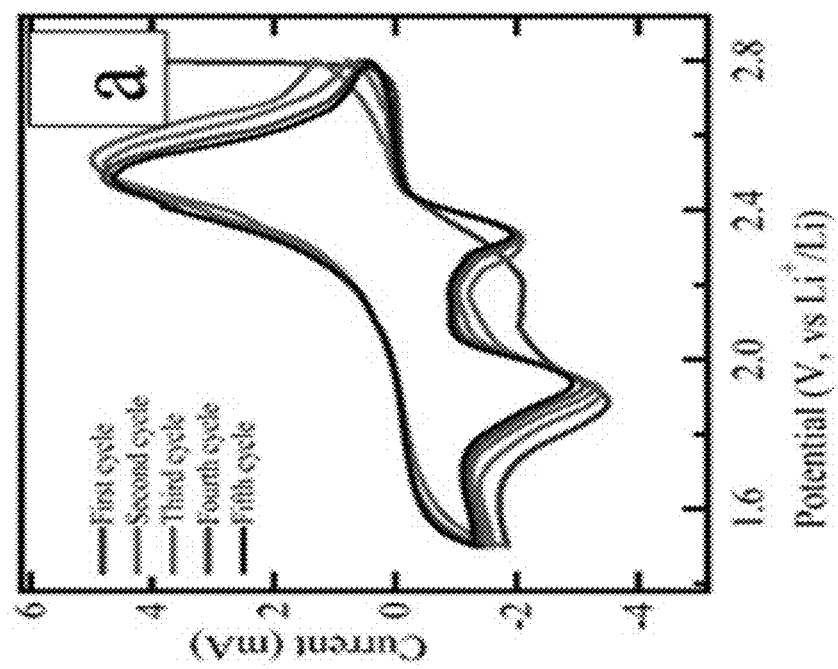
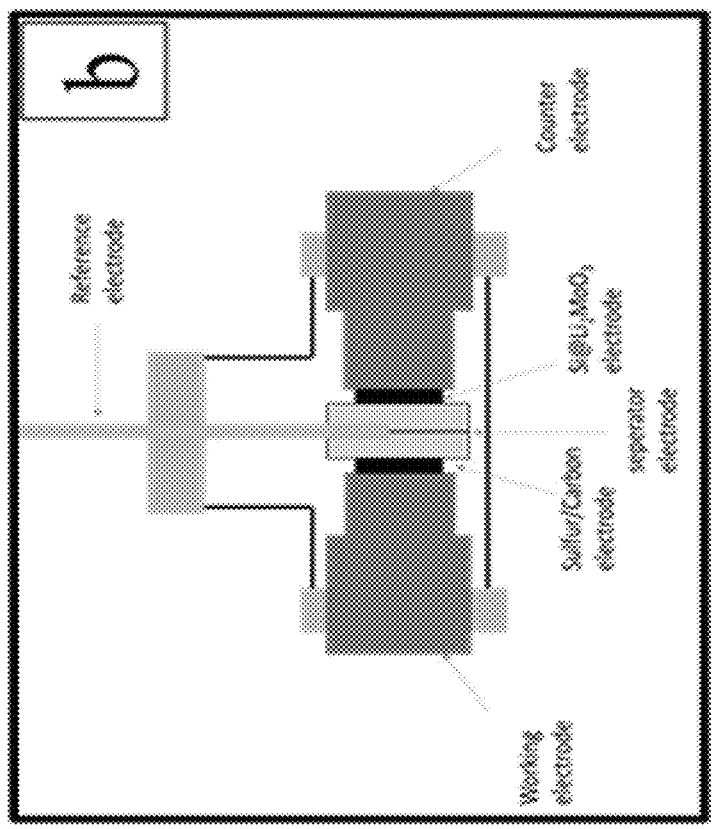
FIG. 4A
FIG. 4B

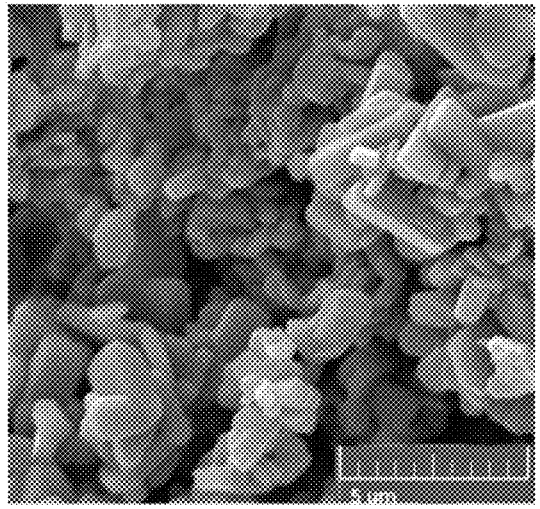
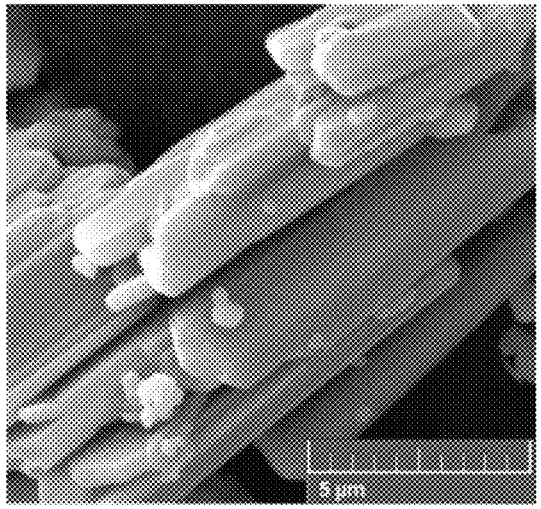
FIG. 7A　　　　　　　　　　FIG. 7B
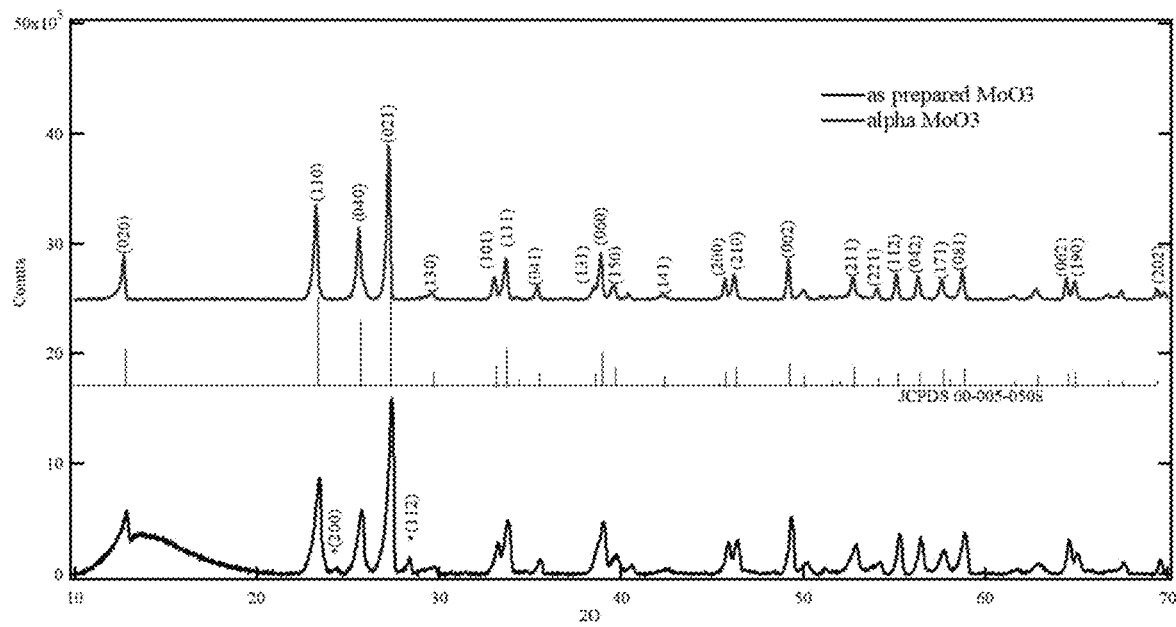
FIG. 7C

LITHIUM MOLYBDATE ANODE MATERIAL

CROSS-REFERENCE TO RELATED APPLICATIONS

This application claims priority to U.S. Provisional Application 62/864,760 filed Jun. 21, 2019, the complete contents of which is incorporated herein by reference.

STATEMENT REGARDING FEDERALLY SPONSORED RESEARCH OR DEVELOPMENT

This invention was made with government support under Grant No. 1624712 awarded by the National Science Foundation. The government has certain rights in the invention.

FIELD OF THE INVENTION

The invention generally relates to a lithiated molybdate anode material, and methods of making the same.

BACKGROUND OF THE INVENTION

Li-air battery (theoretical gravimetric capacity ~3623 Whkg$^{-1}$ [1]) and lithium-sulfur (Li—S) battery (theoretical capacity of 1672 mAh/g [2]) are of large interest toward energy storage for both electric vehicle and stationary applications. But, fabrication of a high capacity sulfur cathode for Li—S battery has always been challenging due to several reasons such as polysulfide dissolution in the ionic electrolytes [3, 4], polysulfide shuttling [5, 6], and high self-discharge [7]. When sulfur electrodes are tested against lithium metal as the anode (half-cell), the electrochemical performance suffers from lithium metal related phenomena such as dendrite formation [8] and SEI layer formation [9]. In order to construct full Li—S cells, the candidate materials for anode must be carefully chosen by considering their cathodic and anodic potential and capacity matching. Graphite, Si and Sn fulfill the above requirements and have been studied as anodes in Li-ion full cells with lithiated oxides as the cathodes. Graphite is not a good anode material for Li—S batteries due to its low gravimetric capacity [10]. On the contrary, Si and Sn have very high specific capacity of 3570 mAhg$^{-1}$ [10] and 991 mAhg$^{-1}$ respectively. However, both the Si and Sn are known for their high-volume expansion upon lithiation; Si expands about 300% and Sn expands by >250%. These volume expansions cause pulverization and cracking [11] of the electrode. However, it has been shown that nanosized silicon particles intimately incorporated with Si can accommodate and withstand the volume expansion of silicon. Also, silicon nanowire architecture has shown promise as an anode material [12]. The expansion and chemical degradation with tin oxide was addressed through decoration of tin oxide nanowires with tin nanoparticles [13]. MoO$_3$ nanowires were shown to be a stable anode material with intercalation potential between that of Si and graphite [14].

MoO$_3$ material has recently attracted attention due to the existence of layered structure in one of its phases ($\alpha$-MoO$_3$). Some of the recent work on MoO$_3$ related to energy storage are discussed in References [14, 15]. They have demonstrated $\alpha$-MoO$_3$ to be a good cathode material for Li-ion batteries with initial discharging capacity of 1043 mAhg$^{-1}$. This discharging capacity as an anode material is a good match for sulfur cathode to be used in a Li—S full cell. MoO$_3$ is known to have several phases and in their work, $\alpha$-MoO$_3$, and $\beta$-MoO$_3$ are synthesized simultaneously using Hot Wire CVD technique. $\alpha$-MoO$_3$ has also been synthesized by other methods such as vapor transport [16] and aqueous solution processing using (Na$_2$MoO$_4$·2H$_2$O) [17].

The low expansion of $\alpha$-MoO$_3$ upon lithiation makes it more suitable than $\beta$-MoO$_3$ for Li—S full cell. Further, it eliminates any safety issue associated with the use of lithium metal anode. One of the major issues with MoO$_3$ is its poor electrical conductivity. The conductivity has been shown to be improved using carbon coating [18]. Even without carbon, vertical arrays of MoOx nanowires have exhibited better cyclability by accommodating high volume change [19].

Several researchers have attempted fabricating Li—S full cells containing silicon anodes using silicon nanowires mixed with carbon and decorated with gold particles [20] and using Si/C [21] with Li$_2$S—C cathode as the lithium source [22]. In each case, poor performances have been observed with continuous degradation of discharge capacity. The reason for such degradation is due to both the use of poorly encapsulated sulfur in the cathode and the degradation of Si upon continuous cycling.

SUMMARY

Aspects of the disclosure provide a high capacity anode material comprising pre-lithiated $\alpha$-MoO$_3$ nanostructures, such as nanowires. The anode material may be used to produce high energy and durable batteries, such as Li—S batteries.

One aspect of the disclosure provides a full cell comprising an anode material as described herein. In some embodiments, the full cell comprises a sulfur cathode and $\alpha$-MoO$_3$ anode. In some embodiments, the sulfur cathode comprises sulfur mixed with activated carbon and coated with mesoporous TiO$_2$.

Another aspect of the disclosure provides a battery comprising at least one full cell as described herein, e.g. a plurality of full cells. In some embodiments, the battery has a specific energy density of at least 300 Wh kg$^{-1}$ after 100 charge-discharge cycles. In some embodiments, the at least one full cell is a pouch cell or a coin cell.

Another aspect of the disclosure provides a method of fabricating an anode material, comprising the steps of synthesizing $\alpha$-MoO$_3$; adding Si nanoparticles to $\alpha$-MoO$_3$; mixing the Si decorated $\alpha$-MoO$_3$ with a carbon binder; and electrochemically lithiating $\alpha$-MoO$_3$. In some embodiments, $\alpha$-MoO$_3$ is synthesized using a hot wire chemical vapor deposition. In some embodiments, the carbon binder is a teflonized mixture of Polytetrafluoroethylene and acetylene black.

Another aspect of the disclosure provides a method of fabricating a full cell having an $\alpha$-MoO$_3$ anode, comprising at least partially enclosing an $\alpha$-MoO$_3$ anode with a first separator material; at least partially enclosing a cathode with a second separator material; placing a lithium metal foil between the $\alpha$-MoO$_3$ anode and the cathode; and electrochemically lithiating $\alpha$-MoO$_3$. In some embodiments, the cathode is a sulfur cathode. In some embodiments, the first and second separator material comprise polypropylene. In some embodiments, the full cell is a pouch cell.

Dashed lines show the separator completely covering both electrodes. Middle inter layer is the lithium foil supported on stainless steel mesh.

Figure 2:
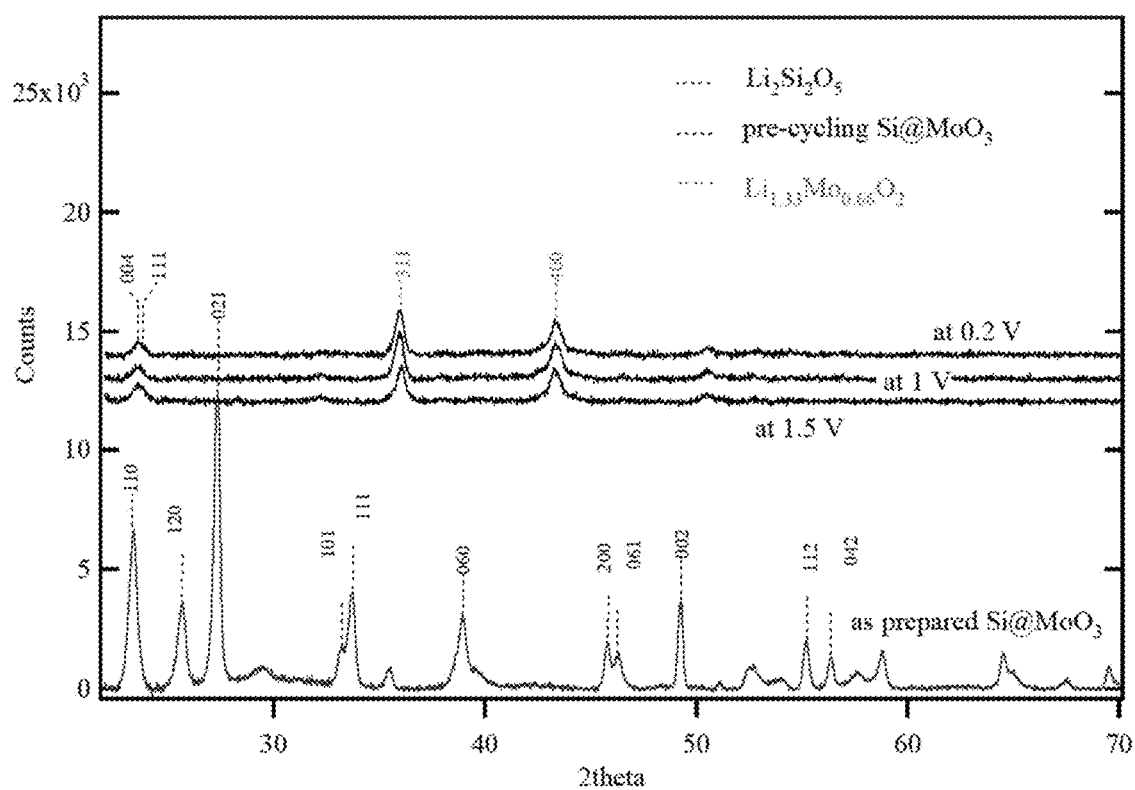

FIG. 2. In-situ XRD analysis for pre-lithiation of Hot Wire CVD deposited $MoO_3$ powder in teflonyzed acetylene black carbon binder electrode. $\alpha$-$MoO_3$ [00-005-0508], $Li_{1.33}Mo_{0.66}O_2$ [01-073-2300] and $Li_2Si_2O_5$ [00-015-0637].

Figures 3A, 3B:
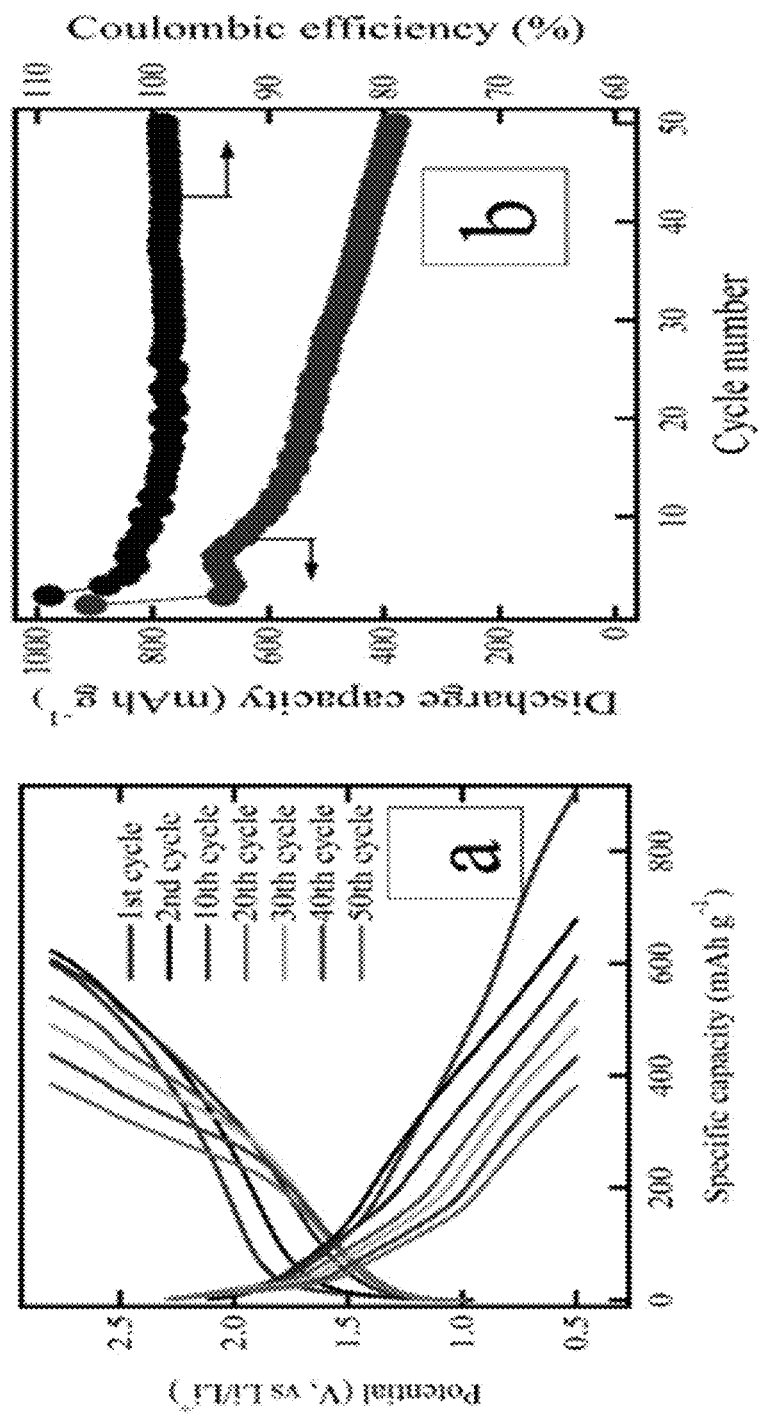

FIG. 3A-B. (a) Potential vs discharge curve of $Li_{1.33}Mo_{0.66}O_2$—S full cell (b) capacity vs cycle number and coulomb capacity of $Li_{1.33}Mo_{0.66}O_2$—S full cell at C/10.

FIG. 4A-B. (a) Cyclic voltammetry curve of $Li_{1.33}Mo_{0.66}O_2$—S(working electrode vs reference electrode) (b) Schematic of three electrode Swagelok test cell which used for CV.

Figure 5A:
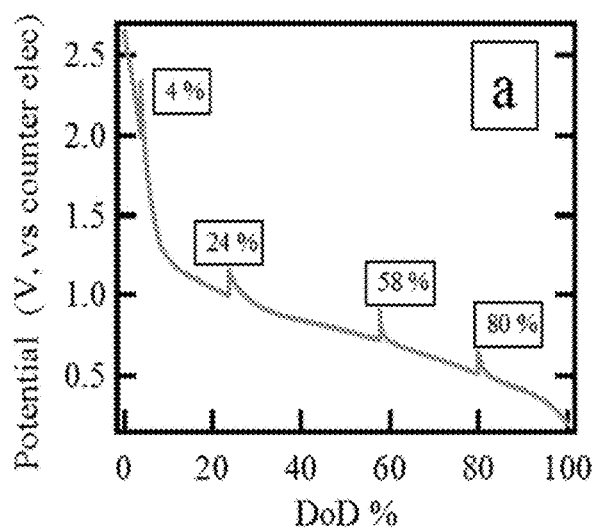
Figure 5B:
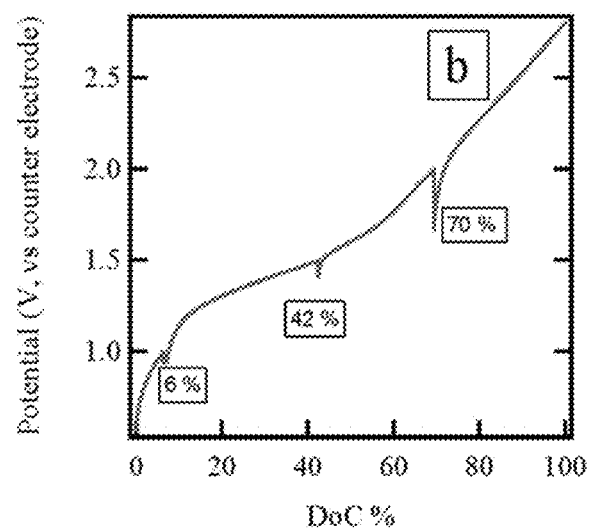
Figure 6A:
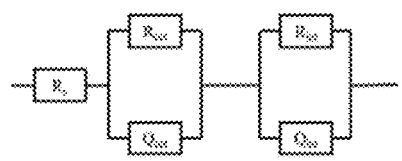
Figure 6B:
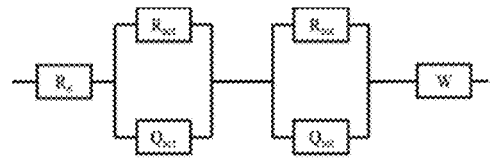
Figure 6C:
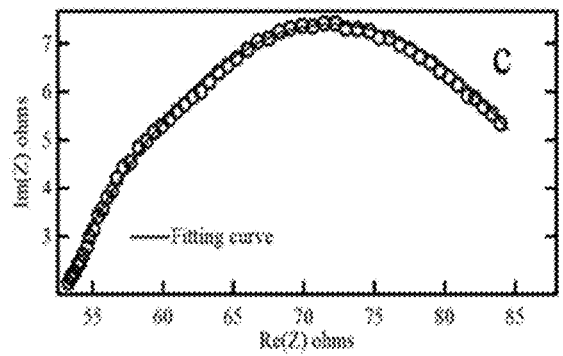
Figure 6D:
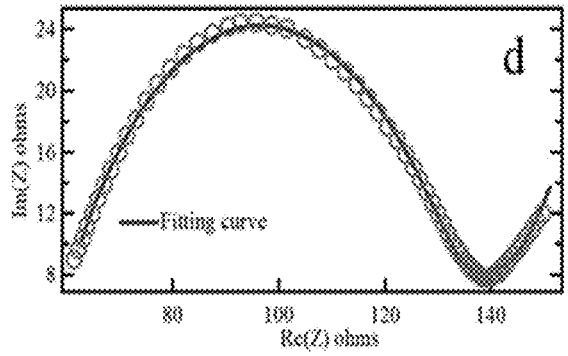
Figure 6E:
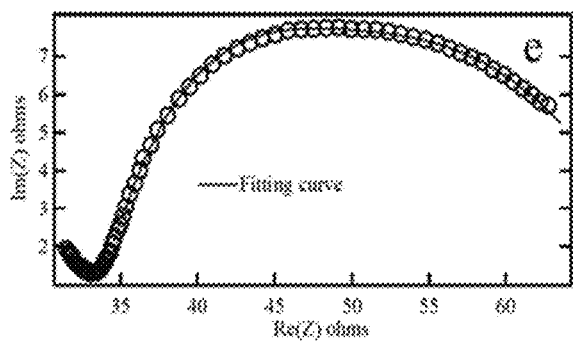
Figure 6F:
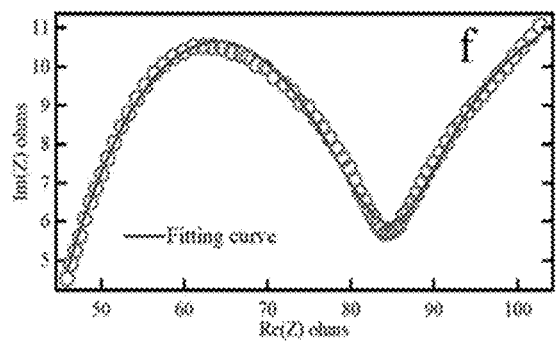

FIG. 5A-B. (a) Discharging and (b) charging curves for impedance analysis. DoD % (percent depth of discharge), DoC % (percent depth of charge). Sharp peaks on discharge and charge curves indicate the points at which the impedance was measured.

FIG. 6A-F. (a) Equivalent circuit for the working electrode and (b) equivalent circuit for counter electrode. Nyquist plots of (c) working (sulfur) electrode at discharge, (d) counter ($Li_{1.33}Mo_{0.66}O_2$) electrode at discharge, (e) working electrode at charging, and (f) counter electrode at charging.

FIG. 7A-C. SEM images of (a) as prepared $MoO_3$ after oxidizing at 500° C. (b) $\alpha$-$MoO_3$ after reduction in 40% $H_2$/Ar at 150° C. (c) XRD spectrums of as prepared $MoO_3$ and $\alpha$-$MoO_3$ after reduction in 40% $H_2$/Ar.

FIG. 8A-D. (a) Potential vs specific capacity curve of sulfur-Li half cell (first cycle) (b) Capacity retention and coulombic efficiency of sulfur-Li half cell (c) Potential vs specific capacity of $\alpha$-$MoO_3$—Li half cell (d) Capacity retention and coulombic efficiency of $\alpha$-$MoO_3$—Li half-cell. Half-cells were cycled at C/3 current rate.

Figure 9A:
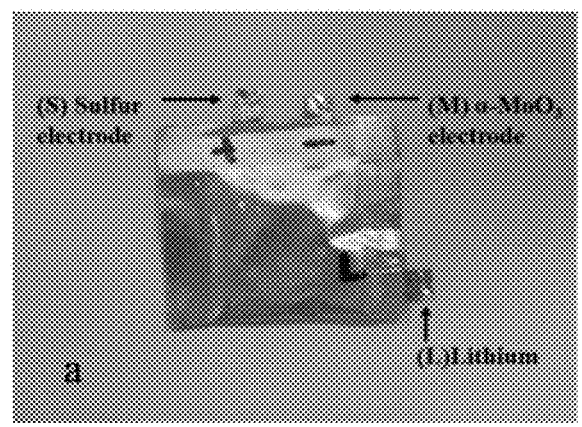
Figure 9B:
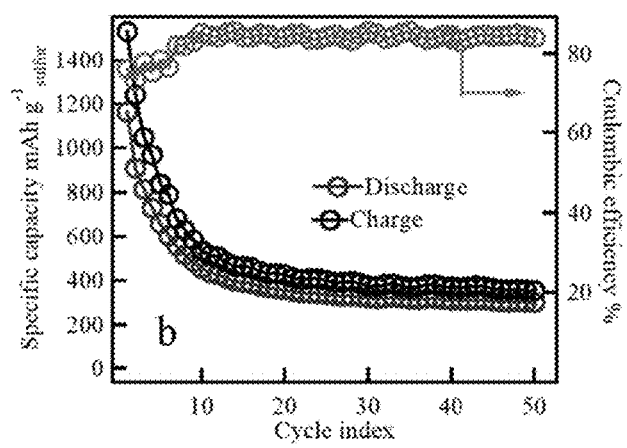
Figure 9C:
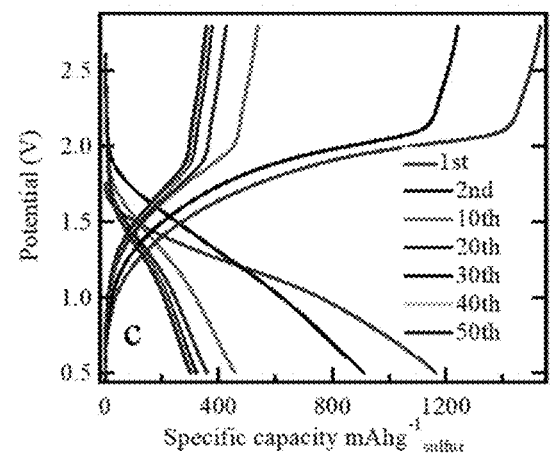

FIG. 9A-C. (a) Picture of a finished pouch cell. (b) Discharge capacity vs Cycle index. (c) Potential vs specific capacity of S—$Li_{1.33}Mo_{0.66}O_2$.

Figures 10A, 10B:
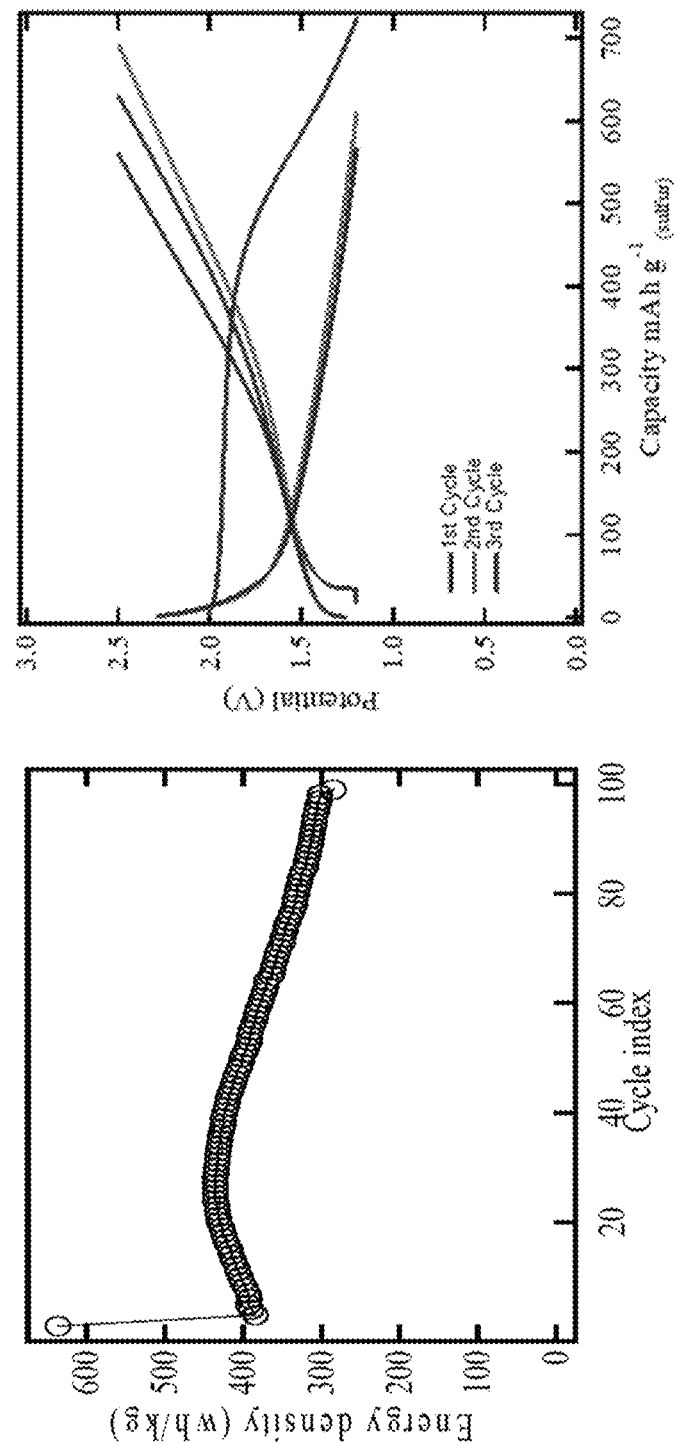

FIG. 10A-B. Electrochemical characteristics of lithium molybdate (nano-wire)-sulfur full cell. (a) Specific energy density curve and (b) potential vs specific capacity curve.

DETAILED DESCRIPTION

Aspects of the disclosure provide pre-lithiated $\alpha$-$MoO_3$ nanostructures, e.g. nanowires, as a high capacity anode material and batteries comprising the same. Pre-lithiation is understood here to mean lithium added to the anode prior to cell assembly. Other sources of lithium include those of the cathode. A high reversible lithium capacity for an anode can be achieved by the phased introduction of lithium by pre-lithiation, forming, aging the cell, and introduction of lithium from the cathode by a full voltage charging step.

Mesoporous $TiO_2$ coated sulfur electrode may be used as the cathode to assemble a lithium molybdate-sulfur battery. Other cathodes known in the art may be suitable with the fast charge anode of the disclosure, such as lithium nickel cobalt manganese oxide (NMC), lithium nickel manganese spinel (LMNO), lithium nickel cobalt aluminum oxide (NCA), lithium iron phosphate (LFP), lithium manganese oxide (LMO), lithium cobalt oxide (LCO), etc.

Nanostructures with large surface areas and numerous active sites can increase the anode capacities and subsequently energy densities of the batteries due to their large spaces and active sites for Li intercalation/deintercalation reactions. Nanostructures compatible with the present disclosure include, but are not limited to, nanowires, etc. Nanostructures generally have a diameter on the order of a nanometer ($10^{-9}$ meters). As used herein, "nanowire" generally refers to a high aspect ratio structure having thickness or diameter in a range from 1 nm to 500 nm and an unconstrained length, typically in a range from 1 µm to 50 µm. The nanowires may be single crystalline, polycrystalline, or amorphous, including amorphous shell, crystalline core nanowires and crystalline shell, amorphous core nanowires with various core and shell thicknesses. Nanowires may also include high aspect ratio structures such as nanorods, nanofibers, and the like. Large scale synthesis of nanowires or nano fibers may be achieved through electro spinning, template-guided growth, shear force spinning, or other methods known in the art.

A lithiated molybdate battery as disclosed herein may have a practical energy density greater than 250 Wh/kg, e.g. greater than 300 Wh/kg. Electrochemically pre-lithiated $\alpha$-$MoO_3$ may be prepared to form a lithium molybdate anode for use in lithium-ion batteries. A lithium-ion battery (Li-ion battery) is a member of a family of rechargeable (secondary) battery types in which lithium ions move from the negative electrode to the positive electrode during discharge and back when charging.

Other molybdates or molybdenum oxides may be compatible with the present disclosure. A molybdate is a compound containing an oxoanion with molybdenum in its highest oxidation state of 6. Molybdenum can form a very large range of such oxoanions which can be discrete structures or polymeric extended structures, although the latter are only found in the solid state. The larger oxoanions are members of group of compounds termed polyoxometalates, and because they contain only one type of metal atom are often called isopolymetalates. The discrete molybdenum oxoanions range in size from the simplest $MoO^{2-}_4$, found in potassium molybdate up to extremely large structures found in isopoly-molybdenum blues that contain for example 154 Mo atoms.

Another aspect of the disclosure provides full cells, e.g. a pouch cell or coin cell, made using pre-lithiated lithium molybdate nanowires as the anode. In some embodiments, the cathode comprises mesoporous titania coated carbon-sulfur. The full cells described herein may exhibit at least 1.4V operating voltage and at least 600-620 Wh/Kg capacity in the first cycle, at least 350-400 Wh/Kg in the second cycle, and at least 250-300 Wh/Kg at the 100th charge-discharge cycle which is higher than the capacity of previous Li-ion batteries. Unless indicated otherwise, performance values referenced herein are at room temperature.

In some embodiments, in-situ electrochemical lithiation of $MoO_3$ anode is provided as a way to fabricate Lithium Molybdate ($Li_2MoO_3$) full cells in one step. In particular, embodiments of the disclosure provide a method of fabricating a full cell having an $\alpha$-$MoO_3$ anode, e.g. as described in the Example. In some embodiments, the steps comprise at least partially enclosing an $\alpha$-$MoO_3$ anode with a first separator material; at least partially enclosing a cathode with a second separator material; placing a lithium metal foil between the $\alpha$-$MoO_3$ anode and the cathode as a sacrificial layer; and electrochemically lithiating $\alpha$-$MoO_3$. In some embodiments, the cathode is a sulfur cathode.

Lithium can be provided to the negative electrode in various ways. In particular suitable approaches include, for example, introducing elemental lithium into the battery, the incorporation of a sacrificial material with active lithium that can be transferred to the negative electrode active material, or preloading of lithium into the negative electrode active material. After the initial charge, supplemental lithium is associated with the negative electrode active material although a portion of the lithium can be associated with irreversible reaction byproducts, such as the solid electrolyte interphase layer.

The technology described herein has a higher specific energy density (it can store more energy per unit of weight) and a reduced cost (e.g. from the use of sulfur) compared to previous Li-ion batteries. Further, $\alpha$-$MoO_3$ can be synthesized in high quantities so that it can be used to scale up the battery fabrication.

Lithium has been used in both primary and secondary batteries. An attractive feature of lithium metal for battery use is its light weight and the fact that it is the most electropositive metal, and aspects of these features can be advantageously captured in lithium-based batteries also. Certain forms of metals, metal oxides, and carbon materials are known to incorporate lithium ions into its structure through intercalation, alloying or similar mechanisms. Lithium ion batteries have generally referred to batteries in which the negative electrode active material is also a lithium intercalation/alloying material.

When lithium ion batteries are in use, the uptake and release of lithium from the positive electrode and the negative electrode induces changes in the structure of the electroactive material. As long as these changes are essentially reversible, the capacity of the material does not change. However, the capacity of the active materials is observed to decrease with cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss is the difference between the charge capacity of the new battery and the first discharge capacity. The irreversible capacity loss results in a corresponding decrease in the capacity, energy and power for the cell due to changes in the battery materials during the initial cycle.

Lithium ion batteries generally comprise a positive electrode (cathode), a negative electrode (anode), a separator between the negative electrode and the positive electrode and an electrolyte comprising lithium ions. The electrodes are generally associated with metal current collectors, such as metal foils. Lithium ion batteries refer to batteries in which the negative electrode active material is a material that takes up lithium during charging and releases lithium during discharging. The nature of the positive electrode active material and the negative electrode active material influences the resulting voltage of the battery since the voltage is the difference between the half cell potentials at the cathode and anode.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidine fluoride, polyimide, polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. In particular, thermally curable polyimide polymers have been found desirable, which may be due to their high mechanical strength.

The positive electrode composition and the negative electrode composition may also comprise an electrically conductive powder distinct from the electroactive composition. Suitable supplemental electrically conductive powders include, for example, graphite, acetylene or carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 15 weight percent distinct electrically conductive powder. A person of ordinary skill in the art will recognize that additional ranges of amounts of electrically conductive powders and polymer binders within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. The electrode material can be cast as a thin film onto the current collector. The electrode material with the current collector can then be dried, for example in an oven, to remove solvent from the electrode. In some embodiments, the dried electrode material in contact with the current collector foil or other structure can be subjected to a pressure, such as, from about 2 to about 10 $kg/cm^2$ (kilograms per square centimeter).

The separator is located between the positive electrode and the negative electrode. The separator is electrically insulating while providing for at least selected ion conduction between the two electrodes. A variety of materials can be used as separators, for example, nonwoven fibers (cotton, nylon, polyesters, glass), polymer films (polyethylene, polypropylene, poly (tetrafluoroethylene), polyvinyl chloride, naturally occurring substances (rubber, asbestos, wood), and the like. Pores of the separator are of sufficient size to allow the ions of the electrolyte to pass through. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, Bis(trifluoromethanesulfonimide) lithium salt (LiTFSI), lithium hexafluorophosphate, lithium hexafluoroarsenate, lithium bis(trifluoromethyl sulfonyl imide), lithium trifluoromethane sulfonate, lithium tris(trifluoromethyl sulfonyl) methide, lithium tetrafluoroborate, lithium perchlorate, lithium tetrachloroaluminate, lithium chloride, lithium difluoro oxalato borate, and combinations thereof.

Traditionally, the electrolyte comprises a 1 M concentration of the lithium salts, although greater or lesser concentrations can be used.

A non-aqueous liquid is generally used to dissolve the lithium salt(s). The solvent generally does not dissolve the electroactive materials. Appropriate solvents include, for example, 1,2-Dimethoxyethane (DME Sigma Aldrich), 1,3-Dioxialane propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol) dimethyl ether), diglyme (diethylene glycol dimethyl ether), DME (glyme or 1,2-dimethyloxyethane or ethylene glycol dimethyl ether), nitromethane and mixtures thereof.

The electrodes described herein can be incorporated into various commercial battery designs, such as prismatic shaped batteries, wound cylindrical batteries, coin batteries or other reasonable battery shapes. The batteries can comprise a single electrode stack or a plurality of electrodes of each charge assembled in parallel and/or series electrical connection(s). In an exemplary embodiment, a coin cell (after electrochemical lithiation) has the following layers in order: coin cell base/can, sulfur cathode, separator and electrolyte, anode material as described herein, spacer (e.g. steel plate), spring (e.g. wave spring), and coin cell lid/cap.

Appropriate electrically conductive tabs can be welded or the like to the current collectors, and the resulting jellyroll or stack structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used. Pouch batteries can be constructed as described in published U.S. patent application 2009/0263707 to Buckley et al, entitled "High Energy Lithium Ion Secondary Batteries", incorporated herein by reference.

The batteries may be of any suitable size or shape, and may be used alone or in a series. Various designs and styles of Li-ion batteries are described, for example, in issued U.S. Pat. No. 9,136,537 (Moon, et al.), U.S. Pat. No. 9,123,957 (Kim, et al.), U.S. Pat. No. 9,118,045 (Marshall, et al.), U.S. Pat. No. 9,105,909 (Ha, et al.), U.S. Pat. No. 9,112,221 (Park, et al.), U.S. Pat. No. 9,088,036 (Roh, et al.), the complete contents of each of which are hereby incorporated by reference in entirety.

Embodiments of the disclosure provides a method of fabricating an anode material, comprising the steps of synthesizing α-$MoO_3$; adding Si nanoparticles to α-$MoO_3$; mixing the Si decorated α-$MoO_3$ with a carbon binder; and electrochemically lithiating α-$MoO_3$.

During the pre-lithiation or electrochemical lithiation step, a reducing current is applied to the anode in such a way as to intercalate (or otherwise host) the lithium. The anode is bathed in a solution comprising a non-aqueous solvent and at least one dissolved lithium salt as described herein, such as LiTFSI. The term nonaqueous solvent is a low molecular weight organic solvent added to an electrolyte which serves the purpose of solvating the inorganic Li salt.

In some embodiments, α-$MoO_3$ is synthesized using chemical vapor deposition (CVD) techniques such as hot wire chemical vapor deposition (HWCVD) or plasma enhanced chemical vapor deposition (PECVD). In some embodiments, the carbon binder is a teflonized mixture of Polytetrafluoroethylene (PTFE) and acetylene black.

The methods which use catalyst materials to facilitate and help control the growth of nanofilaments are referred to as catalytic CVD methods. HWCVD uses a hot filament to chemically decompose source gases. The methods which use no catalyst materials for nanofilament growth are referred to as non-catalytic or pyrolytic CVD methods since only heating, and not catalysis, typically drives nanofilament growth. The catalytic CVD methods often provide greater control over nanofilament growth than non-catalytic methods.

Coating the positive electrode active materials can improve the cycling of the lithium-based battery. The coating can also be effective at reducing the irreversible capacity loss of the battery as well as increasing the specific capacity generally. The amount of coating material can be selected to accentuate the observed performance improvements. Suitable coating materials can comprise metal fluorides, metal oxides, metal non-fluoride halides or metal phosphates.

The present disclosure is the first of its kind using lithium molybdate-sulfur chemistry and provides low cost, high energy density applications utilizing pre-lithiated molybdate anode (e.g electric vehicle and stationary applications). The batteries described herein have a wide range of applications, which include but are not limited to: rechargeable devices such as mobile computing devices, cell phones, tools, watches, electric or hybrid electric vehicles (e.g. cars, airplanes, etc.), smart grids, etc.

Before exemplary embodiments of the present invention are described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

EXAMPLE

Materials and Methods

Sulfur Cathode and MoO$_3$ Anode Preparation

The sulfur cathode is prepared by coating a sulfur/activated carbon electrode with mesoporous TiO$_2$ [23]. α-MoO$_3$ is synthesized using a hot wire chemical vapor deposition (CVD) technique as described in [15]. The material was deposited on the inner wall of a quartz glass tube using a co-centric Mo wire. The synthesis process was carried out for about 72 hours to collect several tens of grams of MoO$_3$ in powder form. The resulting MoO$_3$ was analyzed by XRD and confirmed to be α-MoO$_3$. The color of as synthesized α-MoO$_3$ was found to be blue, which is typical for oxygen deficient, α-MoO$_3$. As described in [15], Si nanoparticles suspended in ethanol is added to α-MoO$_3$ in micro gram quantity (<1% by wt). Then, 5 mg of Silicon decorated α-MoO$_3$ is mixed with 7 mg of teflonized carbon binder (mixture of Polytetrafluoroethylene (PTFE) and acetylene black). This enables easy processing of electrode material to form circular pellets (0.7 mm in diameter and 0.5 mm thick) which can be easily pressed on to a stainless-steel mesh (Alpha Aesar-80 mesh) current collector fitting in CR2032 coin cells.

In the half-cell assembly, metallic Li acts as a reservoir for Li-ions, whereas in the full cell configuration, the lithiated anode material is the only source of Li-ions (in addition to electrolyte). Therefore, capacity balancing is necessary to ensure the availability of active material during cycling. Simple calculation of such capacity matching of sulfur cathode and Li$_{1.33}$Mo$_{0.66}$O$_2$ anode yields that ~5 mg of α-MoO$_3$ is required with 2 mg of sulfur. First, α-MoO$_3$ and Lithium metal electrodes were assembled in the coin cell format in a dry argon glove box as the initial step towards the Li—S full cell fabrication process. The electrolyte used in this cell consists of 1:1 ratio of 1,2-Dimethoxyethane (DME Sigma Aldrich) and 1,3-Dioxialane (DOL Sigma Aldrich) and 1M of Bis(trifluoromethanesulfonimide) lithium salt (LiTFSI) and 1% wt. of LiNO$_3$. The assembled coin cell was connected to a battery tester (Arbin-16 channels) and α-MoO$_3$ was galvanostatically lithiated at C/10 current rate to form Li$_{1.33}$Mo$_{0.66}$O$_2$. In this electrochemical lithiation process, α-MoO$_3$ electrode functions as a cathode. After α-MoO$_3$ is fully lithiated, the coin cell was disassembled inside the glove box and Li$_{1.33}$Mo$_{0.66}$O$_2$ electrode was carefully assembled as the anode in a fresh coin cell against aforementioned sulfur electrode with fresh electrolyte which is same as in the lithiation process. Then the new S—Li$_{1.33}$Mo$_{0.66}$O$_2$ full cell was connected to the battery tester to perform the galvanostatic electrochemical testing.

Pouch Cell Fabrication and Material Preparation

After preliminary investigation of S—Li$_{1.33}$Mo$_{0.66}$O$_2$ full cell in coin cell configuration, it was necessary to scale up the α-MoO$_3$ production to enable the fabrication of high energy Li—S cells. The amount of α-MoO$_3$ synthesized using hot wire CVD technique described above is very low (20 mg in 72 hours). In order to scale up the α-MoO$_3$ synthesis, a novel and cost-effective method was investigated. First, synthesis of pre-lithiated MoO$_3$ using solvo-thermal techniques was attempted, but only resulted in Li$_2$MoO$_4$, which for obvious reasons is not a good reversible anode material for Li—S full cell applications. Since Mo in Li$_2$MoO$_4$ is at its highest oxidation state (+6), when assembled against a sulfur electrode, it cannot be oxidized any further via delithiation and fails to generate any open circuit voltage. Further, it was found to be difficult to directly intercalate lithium into layered MoO$_3$ using chemical or solvo-thermal techniques.

It was necessary to synthesize α-MoO$_3$ in bulk quantity and develop a technique to assemble a Li—S full cell in a single step process, which eliminates the cumbersome process of dis-assembling the cell after initial lithiation and re-assembling as Li—S full cell. In order to synthesize α-MoO$_3$ in bulk quantity, Mo was oxidized by heating Mo powder at 500° C. in air for two hours. MoO$_3$ (white powder) mostly in Monoclinic phase produced after the oxidation in air was converted to Orthorhombic α-MoO$_3$ by heating in a flow of 40% H$_2$/Ar (50 sccm) at 150° C. After 10 hours of processing the initial white power turned blue and the final product was found to be α-MoO$_3$ by XRD.

Figures 1A, 1B:
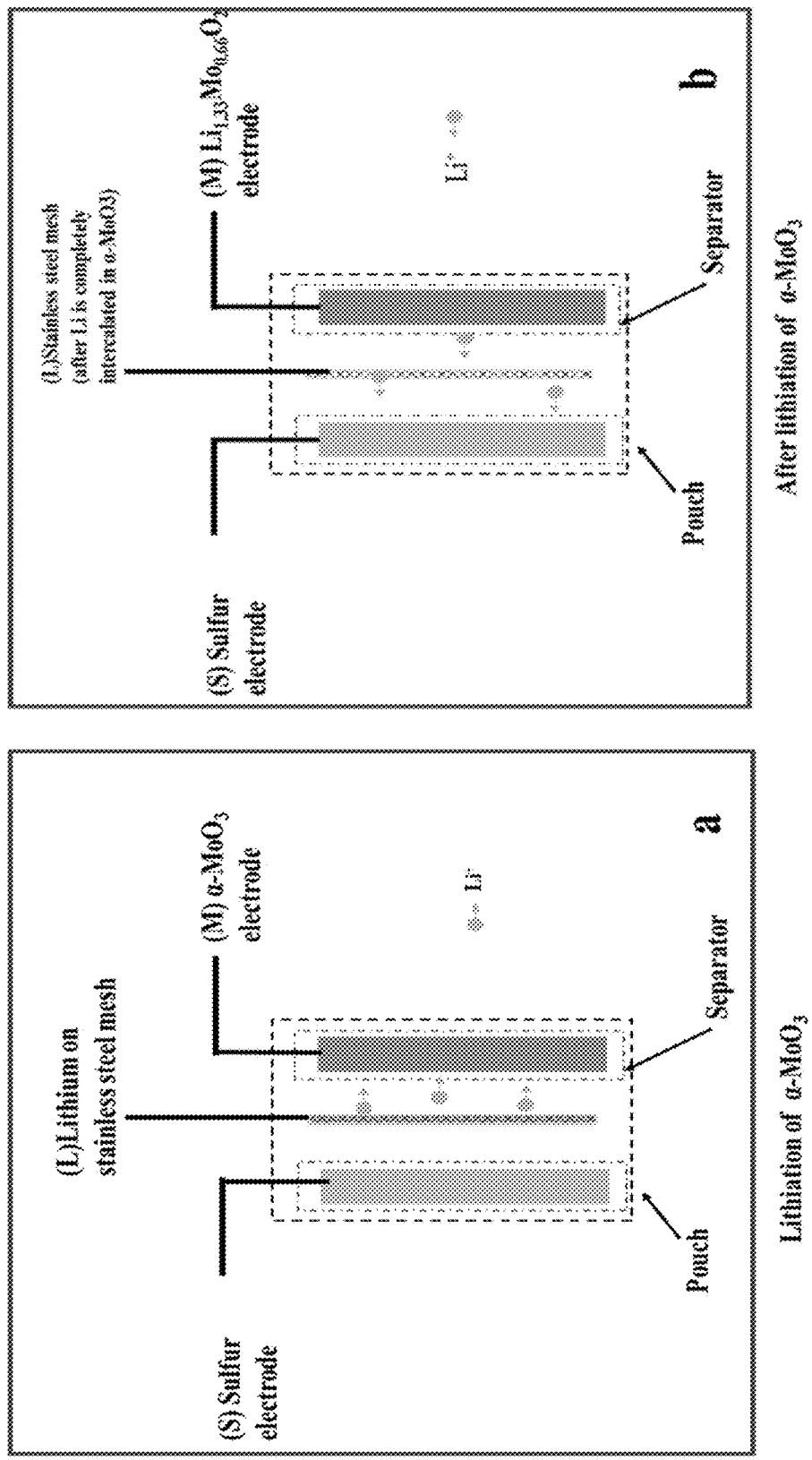
FIG. 1A-B. Schematic diagram of the pouch cell (a) before lithiation of $\alpha$-MoO$_3$ (b) after lithiation of $\alpha$-MoO$_3$.

In order to assemble high energy Li—S cells, electrodes were assembled in a pouch cell configuration. The main goal of this Li—S prototype is to fabricate a Lithium sulfur cell in a single step. In practice, direct synthesis of prelithiated α-MoO$_3$ was found to be difficult. When α-MoO$_3$ is electrochemically prelithiated, Li$^+$ intercalate between the α-MoO$_3$ layers. Therefore, it was necessary to adopt a special design as shown in FIG. 1, to fabricate a Li—S full cell starting with α-MoO$_3$ (before lithiation) and sulfur cathode using a single step process. The schematic diagram in FIG. 1 of the pouch cell shows (a) before lithiation of α-MoO$_3$ AND (b) after lithiation of α-MoO$_3$. Dashed lines show the separator completely covering both electrodes. The middle inter layer is the lithium foil supported on a stainless-steel mesh.

Both cathode (sulfur) and anode (α-MoO$_3$ prior to lithiation) were synthesized in the ambient environment and Aluminum and Nickel tabs were spot-welded to the cathode and anode respectively as the battery terminals. A Polypropylene separator (25 μm) was then wrapped around each electrode. The pouch was fabricated using laminated aluminum sheets (MTI corp.). When designing the pouch cell prototype, target capacity was determined to be 5 mAh. Mass loading, electrode size and pouch size were determined according to the mAh capacity of the pouch cell. Pouch and electrodes were dried in vacuum at 80° C. and then loaded into an Argon glove box for final assembling of the pouch cell. In this special pouch cell design, an additional thin lithium metal foil (80 µm) is sandwiched between the two electrodes which are already wrapped with the separator material to avoid electrical shorting. The Lithium foil serves as a sacrificial layer which is only utilized to lithiate the α-MoO$_3$ anode. After loading the components into the pouch, 0.5 ml of electrolyte consisting of 1:1 ratio of 1,2-Dimethoxyethane (DME Sigma Aldrich) and 1,3-Dioxialane (DOL Sigma Aldrich) and 1M of Bis(trifluoromethanesulfonimide) lithium salt (LiTFSI) and 1% wt. of LiNO$_3$ was filled. Pouch cell is then sealed using a pouch cell sealer inside the glove box. In this initial lithiation process, terminal "L" (Lithium metal) and the terminal "M" (α-MoO$_3$) are connected to the battery tester as the counter electrode and the working electrode respectively. After α-MoO$_3$ is fully lithiated, terminal "M" and terminal "S" (Sulfur) are connected to the battery tester as the counter electrode and the working electrode respectively for full cell cycling. When the full cell is designed, balancing of the electrodes masses is carefully done considering the sulfur cathode as the capacity limiting electrode.

Electrochemical and Structural Analysis

The full cells were cycled between 0.5 V and 2.8 V in galvanostatic mode using 16 channel Arbin battery test system. Cyclic voltammetry (CV) was performed at a scan rate of 0.3 mV/s in the range of 1.5 to 2.8 V (in a three electrode Swagelok cell configuration) using a biologic sp-200 electrochemical system. AC electrochemical impedance spectroscopy (EIS) of the cell utilizing three electrode configuration was used to investigate the same electrochemical system over the frequency range of 1 mHz to 1 MHz. All measurements were carried out at 25° C.

Characterization

The morphology of the electrode surface was characterized by a TESCAN scanning electron microscope (SEM) and phase of materials using X-ray Diffractometer (Bruker D8).

Results and Discussion

Samples with α-MoO$_3$ directly deposited on stainless steel substrates using hot filament CVD were tested in half cell configuration against Li in a coin cell. After full lithiation, the cell was disassembled and the binder free anode material (Li$_{1.33}$Mo$_{0.66}$O$_2$) was tested in a Li—S full cell against sulfur cathode. However, the capacity appears to degrade very quickly presumably due to delamination of anode material. In order to eliminate the delamination problem, α-MoO$_3$ is synthesized by Hot Wire CVD and scraped off the quartz reactor wall in a powder form and then mixed with carbon and binder. To confirm the electrochemical activity of Si decorated MoO$_3$ in carbon/binder matrix, in-situ XRD test is carried while the α-MoO$_3$ is being lithiated. FIG. 2 shows in-situ XRD spectra during lithiation (including the spectrum of the as prepared material) of Hot Wire CVD deposited MoO$_3$ powder in teflonized acetylene black carbon binder electrode. The XRD results confirm that the pre-lithiation process in our sample is similar to that of directly deposited α-MoO$_3$ on stainless steel reported in [15]. The diffraction pattern of the as prepared Si@MoO$_3$ is consistent with α-MoO$_3$ (JCPDS 00-005-0508) having an orthorhombic crystal structure and cell parameters a=3.962 Å, b=13.858 Å, c=3.697 Å. The XRD spectra at the discharge voltages of 1.5 V, 1 V, and 0.2 V show peaks corresponding to Li$_2$Si$_2$O$_5$ (004 and 111 reflections) and Li$_{1.33}$Mo$_{0.66}$O$_2$ (311 and 400 reflections) (JCPDS 01-073-2300). As expected, 311 peak downshifts as the lithiation progresses implying increase of d spacing during lithiation.

The discharge characteristics of the Li$_{1.33}$Mo$_{0.66}$O$_2$—S full cell assembled in a coin cell configuration are presented in FIGS. 3a and 3b during cycling at C/10 rate. Initial capacity of 905 mAhg$^{-1}$ is seen to retain at 400 mAhg$^{-1}$ (with respect to sulfur weight) after 50$^{th}$ cycle at C/10 rate. The full cell is designed in such a way that the capacity is limited by the cathode. The cell has an open cell potential of around 2.3 V. The IR drop of the voltage-capacity curve is higher compared to a Li—S half-cell. The specific capacity is seen to fade steadily with the cycle number. One reason could be due to the loss of Li$^+$ at the solid electrolyte interface. This assumption is validated by the near 100% coulombic efficiency indicating that at each cycle there is a loss of Li$^+$ ions at the SEI layer and degradation of sulfur electrode.

FIG. 4a shows the cyclic voltammetry (CV) curve of Li$_{1.33}$Mo$_{0.66}$O$_2$—S full cell. Three electrode, Swagelok test cell (schematically shown in FIG. 4b) was used for the CV by keeping lithium as the reference electrode, Li$_{1.33}$Mo$_{0.66}$O$_2$ anode as the counter and sulfur cathode as the working electrode. Potential is measured in the range of 2.8-1.5 V between working and reference electrodes while the current is applied between working and counter electrodes. As can be seen from the CV curves shown in FIG. 4a, the oxidation and reduction activity of the sulfur (working) electrode is similar to that of Li—S half-cell electrochemical activity [23]. The reduction peak at 2.4 V is known to occur when soluble Li$_2$S$_8$ forms. Further reduction of longer poly sulfide chains to shorter poly sulfide chains first forming soluble Li$_2$S$_6$ and Li$_2$S$_4$ and finally converting to solid forms of Li$_2$S$_2$ and Li$_2$S is represented by a second reduction peak at 1.9 V. The presence of oxidation peak at 2.5 V, confirms the reversibility of the Li$_{1.33}$Mo$_{0.66}$O$_2$—S full cell which requires enough Li ions (available from the counter electrode) during the cell cycling.

Finally, the electrochemical impedance analysis (EIS) was carried out in the same T-Swagelok cell, (schematically shown in FIG. 4b) but with a platinum wire as the reference electrode. The sulfur electrode is used as the working electrode while Li$_{1.33}$Mo$_{0.66}$O$_2$ electrode is used as the counter electrode. For EIS studies, a platinum wire can be an effective reference electrode [24] with minimal influence on EIS data. Further, the reference electrode is positioned in the middle of two glass-fiber separators of equal thickness (1 mm). The impedance was measured in the A/C frequency range of 1 MHz to 1 mHz at potential values of 1 V, 0.7 V and 0.5 V and 0.2 V (100% DoD) during the discharge and at 1 V, 1.5 V, 2 V and 2.8 V (100% DoC) during the charging as shown in FIGS. 5a and 5b.

The Nyquist plots were plotted as shown in the FIG. 6a-f. Nyquist plots were fitted using EIS fitting software (EC-LAB). A constant phase element and a resistor in parallel represent a semi-circle of Nyquist plots. Two convoluted semi-circles were identified in each Nyquist plot. Resistance values were identified for the electrolyte resistance (R$_e$), Charge transference resistance (R$_{oct}$ (for cathode) and R$_{act}$ (for anode)) and interface resistance (R$_{int}$) by fitting with appropriate network models. Tables 1 and 2 show the variation of fitted resistor values corresponding to DOD % and DOC %.

TABLE 1

Summary of the impedance values obtained at various depth of discharge (DoD)

| | DOD % | | | | | | | |
|---|---|---|---|---|---|---|---|---|
| | 4% | | 58% | | 80% | | 100% | |
| Resistance | cathode Ω | anode Ω | cathode Ω | anode Ω | cathode Ω | anode Ω | cathode Ω | anode Ω |
| $R_e$ | 41.2 | 55.1 | 48.2 | 49.9 | 55.5 | 46.7 | 72.2 | 41.2 |
| $R_{cct}/R_{act}$ | 44.3 | 81.1 | 10.0 | 80.7 | 3.7 | 80.9 | 0.05 | 70.6 |
| $R_{int}$ | 8.2 | 2.6 | 20.9 | 25.7 | 22.4 | 36.3 | 30.9 | 55.2 |

TABLE 2

Summary of the impedance values obtained at various depth of charge (DoC)

| | DOC % | | | | | | | |
|---|---|---|---|---|---|---|---|---|
| | 6% | | 42% | | 70% | | 100% | |
| Resistance | cathode Ω | anode Ω | cathode Ω | anode Ω | cathode Ω | anode Ω | cathode Ω | anode Ω |
| $R_e$ | 40.9 | 40.4 | 41.8 | 40.5 | 38.0 | 48.6 | 31.7 | 82.4 |
| $R_{cct}/R_{act}$ | 15.2 | 20.3 | 12.6 | 40.1 | 22.8 | 58.2 | 32.6 | 74.2 |
| $R_{int}$ | 58.2 | 46.0 | 21.7 | 35.3 | 14.3 | 3.5 | 11.2 | — |

The increase of electrolyte resistance, R(e) in the cathode (table 1) from the initial value of 40Ω up to about 70Ω indicates that lithium polysulfides are formed at 100% discharge. As the electrochemical reaction progresses in the sulfur electrode, charge transfer resistance, $R_{(cct)}$ decreases since electrically insulating elemental sulfur is converted into ionic $Li_2S$. In the same time, solid electrolyte interface on sulfur electrode, $R_{(int)}$ increases from the initial value of 10Ω to the final value of 30Ω. This could be due to the solid $Li_2S$ formation which could influence the electrode-electrolyte interactions. The electrolyte resistance $R_{(e)}$ near anode electrode, however, shows a decrease by few ohms while the interface resistance rises on the anode. Charge transfer resistance of counter electrode, $R_{(act)}$ at discharge however is comparatively stable.

Thus, we can assume that, Carbon/$Li_{1.33}Mo_{0.66}O_2$ electrode integrity is intact while discharging. When the full cell is charged, it is noticeable that, $R_{(e)}$ near the sulfur electrode is decreased as the polysulfide concentration is lowered due to the oxidation of $S^{-2}$ to S. Charge transference resistance $R_{(cct)}$ is increased as the cathode accumulates sulfur introducing poor electronic conductivity of the cathode. It is an interesting phenomenon to observe that, $R_{(int)}$ at cathode drops as the cell is re-charged which is the expected result when $Li_2S$ dissociate to Li and S. Anode on the other hand shows an increase of $R_{(e)}$ and $R_{(act)}$. This can be explained as due to the shuttling of any dissolved polysulfides towards the anode. Migration of dissolved polysulfides is believed to increase the electrolyte resistance ($R_{(e)}$). Increase of $R_{(act)}$ could be due to the lattice expansion of $Li_{1.33}Mo_{0.66}O_2$ upon recharge, causing Carbon/$Li_{1.33}Mo_{0.66}O_2$ contact loss.

FIGS. 7(a) and (b) show the SEM images of as prepared $MoO_3$ (by direct oxidation of Mo powder) and after reduction in a flow of Ar/$H_2$ respectively. The as prepared $MoO_3$ sample consists of planar platelets co-existing with other irregular particles smaller than 5 μm as seen in the SEM image in FIG. 7(a). It appears that the initial oxidation of Mo results in mixed α/β-$MoO_3$ phases. After reduction in $H_2$/Ar, the morphology of the particles has been changed primarily to larger planar platelets of α-$MoO_3$ as evidenced by the SEM image in FIG. 7b. FIG. 7(c) shows the XRD spectra of $MoO_3$ sample before and after reduction. The XRD spectrum for the sample before reduction is consistent with α-$MoO_3$ (JCPDS 00-005-0508) having an orthorhombic crystal structure with cell parameters a=3.962 Å, b=13.858 Å, c=3.697 Å and additional peaks located at 2θ=23.95° and 28.73° which were assigned to the characteristic reflections from (020) and (112) planes of β-$MoO_3$ (JCPDS 01-084-1360), respectively. The XRD pattern for the sample after reduction mostly consists of α-$MoO_3$.

FIG. 8(a)-(d) shows the half-cell electrochemical performance of sulfur cathode (sulfur mixed with activated carbon and coated with mesoporous $TiO_2$) [23] and α-$MoO_3$ anode each against Li/Li+. The cathode shows capacity as high as 900 mAh/g even after 100 cycles at C/3 rate, but the anode capacity fades to ~300 mAh/g after 50 cycles. Pristine sulfur cathode has a potential of 2.4 V and Fully lithiated α-$MoO_3$ ($Li_{1.33}Mo_{0.66}O_2$) has a potential of ~0.2 V versus lithium. Therefore, a combination of these two electrodes will give an open circuit voltage of ~2.3 V.

Figure 8A:
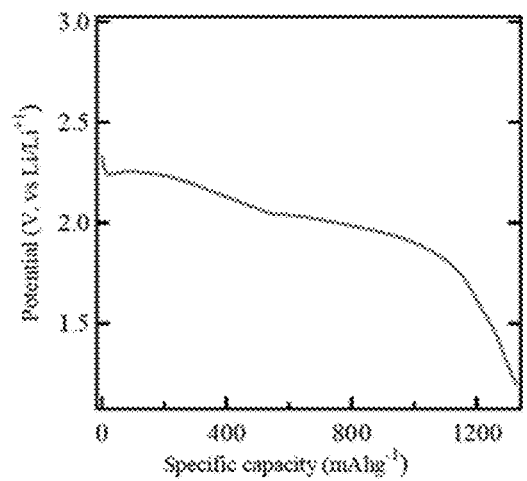
Figure 8B:
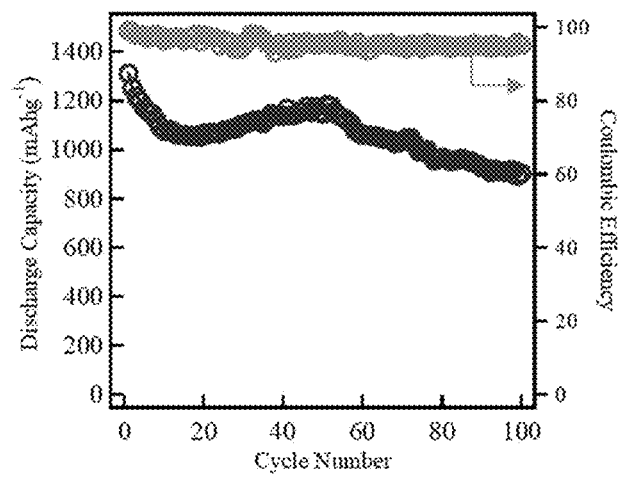
Figure 8C:
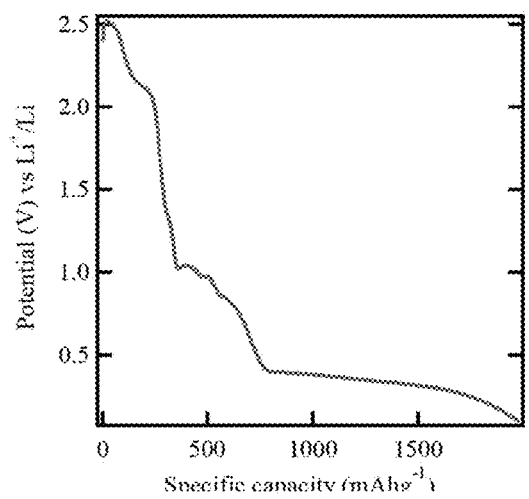
Figure 8D:
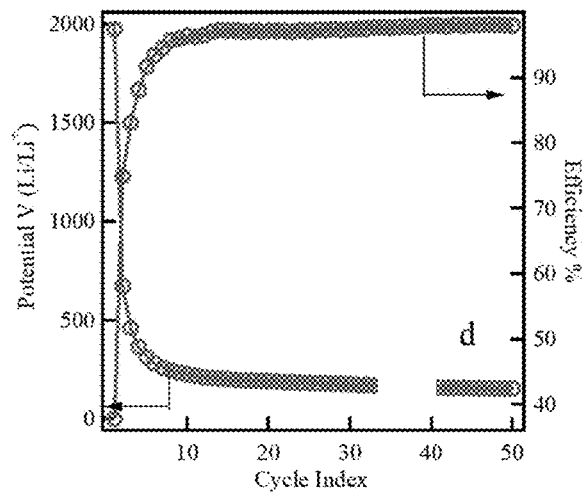

High energy pouch cell was also tested using Arbin battery tester. FIGS. 9b and 9c show the performance of the pouch cell assembled from the respective cathode and anodes after initial lithiation process. The pouch cell has a gravimetric capacity of 1500 mAh $g^{-1}$ at the first cycle and about 380 mAh $g^{-1}$ at the $50^{th}$ cycle and the cell is cycled at C/3 rate. In terms of the specific capacity, it is apparent that, the Li—S battery with sulfur/carbon cathode and α-$MoO_3$ anode in the proposed pouch cell design provide a specific capacity greater than that of available Li-ion technologies, but at a lower nominal potential ~1.4 V. The sulfur cathode used in this full cell was developed by our group [23] showing a stable specific capacity over 900 mAh $g^{-1}$ over 100 cycles. However, the specific capacity of the full cell was found to degrade from its high initial value and stabilize at 300 mAh $g^{-1}$. The reason for such capacity degradation could due to the performances of the $Li_{1.33}Mo_{0.66}O_2$ anode which tend to stabilize around 300 mAh $g^{-1}$ as shown in FIG. 8d.

The same pouch cell design was used to assemble high energy density pouch cells using α-$MoO_3$ nanowires. The α-$MoO_3$ nanowires were synthesized by hydrogenating the impure $MoO_3$ which was derived by solvothermal reaction of 5:1 wt % ratio of $MoO_2$ and KCl at 500° C. In contrast to the anodes made of α-$MoO_3$ micro particles, α-$MoO_3$ nanowires demonstrate a stable specific capacity of 400 mAh $g^{-1}$ at C/10 rate. In addition, its delithiation potential ranges from 0.2 V to 1.5 V. In the reference [15], binder free α-$MoO_3$ anode demonstrates superior discharge specific capacity giving ~1000 mAh $g^{-1}$ vs lithium, but its mass loading is very low. We believe, that 400 mAh $g^{-1}$ of nano-wire based α-$MoO_3$ anode is due to its electrode pulverization. To gain a stable potential plateau around 1.5 V in lithium molybdate-sulfur pouch cell, mass balancing was done within the delithiation potential 0.2 V-1.0 V for the anode to compensate the practical 700 mAh $g^{-1}$ capacity of the sulfur cathode. FIG. 10a shows the specific energy density data of lithium molybdate nanowire-sulfur full cell with a 5 mAh capacity with a mass loading of 4.2 mg on the cathode and 5.6 mg on the anode. The assembled full cell demonstrates a promising 300 Wh $kg^{-1}$ specific energy density after $100^{th}$ cycle with a stable 1.4 V nominal potential as shown in FIGS. 10a and 10b.

CONCLUSION

In this Example, it has been shown that $Li_{1.33}Mo_{0.66}O_2$ is useful as an anode material in Li—S batteries. Cyclic voltammetry data of Li—S full cell indicate that redox reactions in the sulfur electrode are similar to that of sulfur electrode in Li—S half-cell indicating presence of sufficient lithium ion supply from the lithium molybdate anode. In addition, α-MoO$_3$ can be synthesized in high quantities using H$_2$/Ar so that α-MoO$_3$ can be used in powder form to scale up the Li—S full cell fabrication. Further, it is found that, lithium molybdate for the Li—S full cell can only be made using intercalation, but not with chemical reaction.

REFERENCES

1. Lu, J., et al., *Aprotic and aqueous Li—O(2) batteries*. Chem Rev, 2014. 114(11): p. 5611-40.
2. Manthiram, A., et al., *Rechargeable lithium-sulfur batteries*. Chem Rev, 2014. 114(23): p. 11751-87.
3. Scheers, J., S. Fantini, and P. Johansson, *A review of electrolytes for lithium-sulphur batteries*. Journal of Power Sources, 2014. 255: p. 204-218.
4. Zhang, S. S., *Liquid electrolyte lithium/sulfur battery: Fundamental chemistry, problems, and solutions*. Journal of Power Sources, 2013. 231: p. 153-162.
5. Diao, Y., et al., *Shuttle phenomenon—The irreversible oxidation mechanism of sulfur active material in Li—S battery*. Journal of Power Sources, 2013. 235: p. 181-186.
6. Mikhaylik, Y. V. and J. R. Akridge, *Polysulfide Shuttle Study in the Li/S Battery System*. Journal of The Electrochemical Society, 2004. 151(11): p. A1969.
7. Ryu, H. S., et al., *Self-discharge characteristics of lithium/sulfur batteries using TEGDME liquid electrolyte*. Electrochimica Acta, 2006. 52(4): p. 1563-1566.
8. M. Hagen, E. Q.-G., S. Dörfler, G. Fahrer, J. Tübke, M. J. Hoffmann, and R. S. H. Althues, M. Krampfert, S. Kaskel, H. Föll *studies of preventing Li dendrite formation in Li—S batteries by using Si microwire anodes.pdf*. Journal of Power Sources, 2014. 248: p. 1058-1066.
9. An, S. J., et al., *The state of understanding of the lithium-ion-battery graphite solid electrolyte interphase (SEI) and its relationship to formation cycling*. Carbon, 2016. 105: p. 52-76.
10. Liang, B., Y. Liu, and Y. Xu, *Silicon-based materials as high capacity anodes for next generation lithium ion batteries*. Journal of Power Sources, 2014. 267: p. 469-490.
11. Kasavajjula, U., C. Wang, and A. J. Appleby, *Nano-and bulk-silicon-based insertion anodes for lithium-ion secondary cells*. Journal of Power Sources, 2007. 163(2): p. 1003-1039.
12. Candace K. Chan, H. P., Gao Liu, Kevin MCilwrath, Xiao Feng Zhang, and R. A. H. a. Y. Cui, *High performance lithium battery anodes using silicon nano wires*. nature nanotechnology, 2007. 3.
13. Praveen Meduri, C. P., Vivekanand Kumar, and a. M. K. S. Gamini U. Sumanasekera, *Hybrid Tin Oxide Nanowiires as Stable and High Capacity Anodes Li-Ion Batteries*. Nano Lett, American Chemical Society 2009. 9(2): p. 612-616.
14. Meduri, P., et al., *MoO3-x Nanowire Arrays As Stable and High-Capacity Anodes for Lithium Ion Batteries*. Nano Letters, 2012. 12(4): p. 1784-1788.
15. Martinez-Garcia, A., et al., *High rate and durable, binder free anode based on silicon loaded MoO3 nanoplatelets*. Scientific Reports, 2015. 5: p. 10530.
16. Weiyang Li, F. C., Zhanliang Tao, and Jun Chen, *vapor transportation preparation and reverible lithium intercalation deintercalation of alpha microrods*. Journal of Physical Chemistry, 2005. 110: p. 119-124.
17. Sakaushi, K., et al., *Aqueous Solution Process for the Synthesis and Assembly of Nanostructured One-Dimensional α-MoO3 Electrode Materials*. Chemistry of Materials, 2013. 25(12): p. 2557-2563.
18. Hassan, M. F., et al., *Carbon-coated MoO3 nanobelts as anode materials for lithium-ion batteries*. Journal of Power Sources, 2010. 195(8): p. 2372-2376.
19. Meduri, P., et al., *MoO(3-x) nanowire arrays as stable and high-capacity anodes for lithium ion batteries*. Nano Lett, 2012. 12(4): p. 1784-8.
20. Krause, A., et al., *High Area Capacity Lithium-Sulfur Full-cell Battery with Prelitiathed Silicon Nanowire-Carbon Anodes for Long Cycling Stability*. Sci Rep, 2016. 6: p. 27982.
21. Himendra Jha, I. B., Xueyin Cui, Stefano Meini,*, and Hubert A. Gasteiger, *<Li_S batteries with Li2S cathodes and Si_C anodes.pdf>*. Journal of The Electrochemical Society, 2015. 9(A1829-A1835).
22. Yang, Y., et al., *New nanostructured Li2S/silicon rechargeable battery with high specific energy*. Nano Lett, 2010. 10(4): p. 1486-91.
23. Dharmasena, R., et al., *Mesoporous TiO2 coating on carbon-sulfur cathode for high capacity Li-sulfur battery*. RSC Advances, 2018. 8(21): p. 11622-11632.
24. Kasem, B. K. K. and S. Jones, *Platinum as a Reference Electrode in Electrochemical Measurements*. Platinum Metals Review, 2008. 52(2): p. 100-106.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

We claim:

1. A method of fabricating a pre-lithiated α-MoO$_3$ electrode material comprising pre-lithiated α-MoO$_3$, comprising the steps of:
    synthesizing α-MoO$_3$;
    adding Si nanoparticles to the α-MoO$_3$ to form Si decorated α-MoO$_3$;
    mixing the Si decorated α-MoO$_3$ with a carbon binder to form an α-MoO$_3$ electrode material;
    in a half cell configuration, electrochemically lithiating the α-MoO$_3$ electrode material by contacting the α-MoO$_3$ electrode material with an electrolyte containing a lithium salt while applying a reducing current, wherein during the electrochemically lithiating step the α-MoO$_3$ electrode material functions as a cathode and lithium from the electrolyte containing a lithium salt is intercalated into the α-MoO$_3$ of the α-MoO$_3$ electrode material, and wherein the electrochemically lithiating step produces the pre-lithiated α-MoO$_3$ electrode material.

2. The method of claim 1, wherein α-MoO$_3$ is synthesized using hot wire chemical vapor deposition.

3. The method of claim 1, wherein the carbon binder is a teflonized mixture of Polytetrafluoroethylene (PTFE) and acetylene black.

4. A method of fabricating a Li—S full cell pouch battery comprising a pre-lithiated α-MoO$_3$ electrode configured to function as an anode, comprising:
    forming α-MoO$_3$ into an electrode;
    at least partially enclosing the α-MoO$_3$ electrode with a first separator material;

at least partially enclosing a cathode with a second separator material;

loading the α-MoO$_3$ electrode and the cathode into a pouch cell;

within the pouch cell, placing a lithium metal foil between the first separator material and the second separator material such that the lithium metal foil is separated from the cathode and acts as a sacrificial layer;

electrochemically lithiating the α-MoO$_3$ electrode by i) filling the pouch cell with an electrolyte containing a lithium salt, thereby contacting the α-MoO$_3$ electrode and the lithium metal foil with the electrolyte, and ii) with the lithium metal foil as a counter electrode and the α-MoO$_3$ electrode as a working electrode which functions as a cathode, applying a reducing current to lithiate the α-MoO$_3$ electrode, thereby forming a pre-lithiated α-MoO$_3$ electrode, wherein the sacrificial layer is only utilized to lithiate the α-MoO$_3$ anode; then configuring the cathode as the working electrode and the pre-lithiated α-MoO$_3$ electrode as a counter electrode which functions as an anode, thereby forming the Li—S full cell pouch battery.

5. The method of claim 4, wherein the cathode is a sulfur cathode.

6. The method of claim 4, wherein the first separator material and second separator material comprise polypropylene.

7. The method of claim 1, wherein the α-MoO$_3$ does not contain any additional coating material.

8. The method of claim 4, wherein the α-MoO$_3$ does not contain any additional coating material.

9. The method of claim 1, wherein, prior to the step of electrochemically lithiating, the α-MoO$_3$ electrode material is configured into a coin cell shape.

10. The method of claim 1, wherein the electrolyte is a 1:1 ratio of 1,2-dimethoxyethane (DME), 1,3-dioxialane (DOL), 1M of bis(trifluoromethanesulfonimide) lithium salt (LiTFSI) and 1% wt. of LiNO$_3$.

11. The method of claim 1, wherein the α-MoO$_3$ electrode material is a powder.

12. A method of preparing a full cell comprising preparing a pre-lithiated α-MoO$_3$ high-capacity electrode material by the method of claim 1, and assembling, in an electrolyte comprising a Li salt, the pre-lithiated α-MoO$_3$ high-capacity electrode material as an anode and a sulfur electrode as a cathode, thereby preparing the full cell.

13. The method of claim 12, wherein the electrolyte is a 1:1 ratio of 1,2-dimethoxyethane (DME), 1,3-dioxialane (DOL), 1M of bis(trifluoromethanesulfonimide) lithium salt (LiTFSI) and 1% wt. of LiNO$_3$.

14. The method of claim 4, further comprising, prior to the step of forming, synthesizing α-MoO$_3$ in bulk quantity by oxidizing Mo powder by heating in air to form monoclinic phase MoO$_3$ and converting the monoclinic phase MoO$_3$ to α-MoO$_3$ particles by heating under H$_2$/Ar.

15. The method of claim 4, wherein the α-MoO$_3$ is in the form of nanowires.

16. The method of claim 13, wherein the nanowires are synthesized by hydrogenating impure MoO$_3$ derived by a solvothermal reaction of MoO$_2$ and KCl.

17. The method of claim 4, wherein the electrolyte is a 1:1 ratio of 1,2-dimethoxyethane (DME), 1,3-dioxialane (DOL), 1M of bis(trifluoromethanesulfonimide) lithium salt (LiTFSI) and 1% wt. of LiNO$_3$.

* * * * *